United States Patent [19]

McClure

[11] Patent Number: 4,842,065

[45] Date of Patent: Jun. 27, 1989

[54] OIL RECOVERY PROCESS EMPLOYING CYCLIC WETTABILITY ALTERATION

[75] Inventor: D. Craig McClure, Littleton, Colo.

[73] Assignee: Marathon Oil Company, Findlay, Ohio

[21] Appl. No.: 192,454

[22] Filed: May 11, 1988

[51] Int. Cl.[4] .......................................... E21B 43/22
[52] U.S. Cl. ..................................... 166/252; 356/274
[58] Field of Search .............. 166/252, 273, 274, 275, 166/263

[56] References Cited

U.S. PATENT DOCUMENTS

| | | | |
|---|---|---|---|
| 2,792,894 | 5/1957 | Graham et al. | 166/42 |
| 3,134,433 | 5/1964 | Bocquet et al. | 166/9 |
| 3,343,597 | 9/1967 | Gogarty et al. | 166/9 |
| 3,346,047 | 10/1967 | Townsend et al. | 166/9 |
| 3,369,602 | 2/1968 | Fallgatter et al. | 166/9 |
| 3,386,506 | 6/1968 | Quance | 166/9 |
| 3,490,527 | 1/1970 | Cook et al. | 166/245 |
| 3,498,278 | 3/1970 | Stone et al. | 166/263 |
| 3,500,920 | 3/1970 | Raifsnider | 166/273 |
| 3,548,941 | 12/1970 | Graham et al. | 166/273 |
| 3,876,002 | 4/1975 | Sarem | 166/274 |
| 4,004,637 | 1/1977 | Needham et al. | 166/273 |
| 4,230,182 | 10/1980 | Bousaid | 166/273 |
| 4,266,611 | 5/1981 | Bousaid et al. | 166/273 |
| 4,271,906 | 6/1981 | Bousaid et al. | 166/273 |
| 4,364,431 | 12/1982 | Saidi et al. | 166/275 |
| 4,438,814 | 3/1984 | Bousaid | 166/273 |
| 4,694,904 | 9/1987 | Sengul et al. | 166/252 |

OTHER PUBLICATIONS

Brownscombe, E. R. and Dyes, A. B., "Water-Imbibition Displacement-Can It Release Reluctant Spraberry Oil?," The Oil and Gas Journal, Nov. 17, 1952, pp. 264-265, 377-378.

Primary Examiner—William P. Neuder
Attorney, Agent, or Firm—Jack L. Hummel; Rodney F. Brown

[57] ABSTRACT

A surfactant solution is injected into an oil-wet fractured formation and becomes the preferred wetting phase of the matrix blocks in the formation thereby displacing oil from the matrix blocks into the fracture network, The formation is then flooded with water to displace the oil from the fracture network to the surface while returning the matrix blocks to an oil-wet condition. The injection cycle is repeated until the formation is depleted.

20 Claims, 1 Drawing Sheet

OIL RECOVERY PROCESS EMPLOYING CYCLIC WETTABILITY ALTERATION

BACKGROUND OF THE INVENTION

1. Technical Field

The invention relates to a process for recovering oil from a subterranean oil-bearing formation and more particularly to a process for cycling wettability-altering fluids through a subterranean oil-bearing formation to enhance oil recovery therefrom.

2. Background Information

The art recognizes that oil recovery by means of conventional waterflooding is ineffective in fractured formations because channeling occurs through the fracture network. The art proposes a number of solutions to this problem. Brownscombe et al, Stone et al, and Sengul et al expressly employ imbibition displacement processes to increase oil recovery relative to conventional waterflooding in fractured formations.

"Water-Imbibition Displacement", E. R. Brownscombe et al, Oil & Gas Journal, v. 51, n. 28, Nov. 17, 1952, page 264, describes an oil recovery process employing water-imbibition displacement in the naturally-fractured water-wet Spraberry Field of West Texas.

U.S. Pat. No. 3,498,378 to Stone et al utilizes a surfactant solution in the Spraberry Field to pressurize the formation and change its preferential wettability from water- to oil-wet. Oil is then produced until the water-to-oil ratio reaches an economic limit. Production is interrupted and water is injected into the formation to restore the bottom hole pressure. Oil production resumes again until it falls below acceptable economic limits. Pressure pulsing with water is repeated until diminished recovery necessitates the injection of additional surfactant. The cycle can be repeated until the formation is depleted.

U.S. Pat. No. 4,694,904 to Sengul et al cyclically floods a fractured formation with two separate fluids having disparate mobilities. The lower mobility fluid may be a polymer solution and the higher mobility fluid may be water or a surfactant solution. The process is designed to match the performance of a continuous polymer flood, but at a lower cost because polymer use for the process is reduced.

U.S. Pat. No. 4,364,431 to Saidi et al utilizes a surfactant to augment a waterflood which displaces oil from a fractured oil-wet formation by a gravity drive mechanism rather than an imbibition displacement mechanism. Saidi suggests that the surfactant reduces the interfacial tension between the water in the fractures and the oil in the matrix blocks of the formation, which enables the oil to enter the fractures where it is driven upward to a producing well by the density difference between water and oil.

The above-cited references fail to realize the full potential of an imbibition displacement process to recover oil from a formation. Although Brownscombe et al, Stone et al, and Sengul et al expressly employ an imbibition displacement mechanism, none of the references recognize specific improvements which could render the mechanism more effective. Furthermore, none of the references recognize the utility of the mechanism beyond water-wet formations.

A need exists for a process which substantially improves the performance of fluids which are injected into a fractured formation to recover oil from the formation. A further need exists for a process which both maximizes the amount of oil recovered from a fractured formation and accelerates the rate of oil production from the formation without substantially increasing the volume requirement of injected fluids.

SUMMARY OF THE INVENTION

The present invention is a process for recovering oil from an oil-wet fractured subterranean formation by altering the wettability of the oil-bearing formation with cyclically injected fluids. The process utilizes an imbibition displacement mechanism to both increase and accelerate oil recovery from the formation. The process is particularly effective in fractured oil-wet formations which have undergone primary and secondary oil recovery by either waterflooding or polymer-augmented waterflooding, but wherein a substantial portion of oil remains unrecovered in the matrix blocks of the fractured formation.

The process employs a class of compositions commonly known as surfactants to alter the initial preferential wettability of an oil-wet formation. The process is initiated by injecting a slug of a surfactant solution into a wellbore in fluid communication with the oil-wet formation. The solution enters the fracture network of the formation and subsequently imbibes into a portion of the matrix blocks adjacent the fracture network. The solution renders the portion of the matrix blocks it contacts surfactant-wet. The solution simultaneously displaces oil from the surfactant-wet portion of the matrix blocks into the fracture network.

Following injection of the surfactant solution, the formation is waterflooded. The waterflood performs two functions. First, the waterflood desorbs the surfactant solution from the surfactant-wet portion of the matrix blocks, restoring this portion of the matrix blocks to an oil-wet condition. Second, the waterflood displaces the oil residing in the fracture network to the surface via a production well where the oil is recovered. The waterflood is continued until the water-to-oil ratio of recovered fluids becomes uneconomical at which point it is terminated.

After termination of the waterflood, the injection cycle is repeated anew by injecting a second slug of the surfactant solution into the formation followed by a waterflood. The cycle can be repeated as often as desired until the formation is depleted.

The invention is particularly advantageous because it enables oil recovery from an oil-wet formation by an imbibition displacement mechanism which was previously believed to only have utility in water-wet formations. The present process employs a fluid injection sequence which enables the surfactant to more fully penetrate the matrix blocks and contact additional oil heretofore unrecoverable from a fractured oil-wet formation.

DESCRIPTION OF PREFERRED EMBODIMENTS

Figure 1:
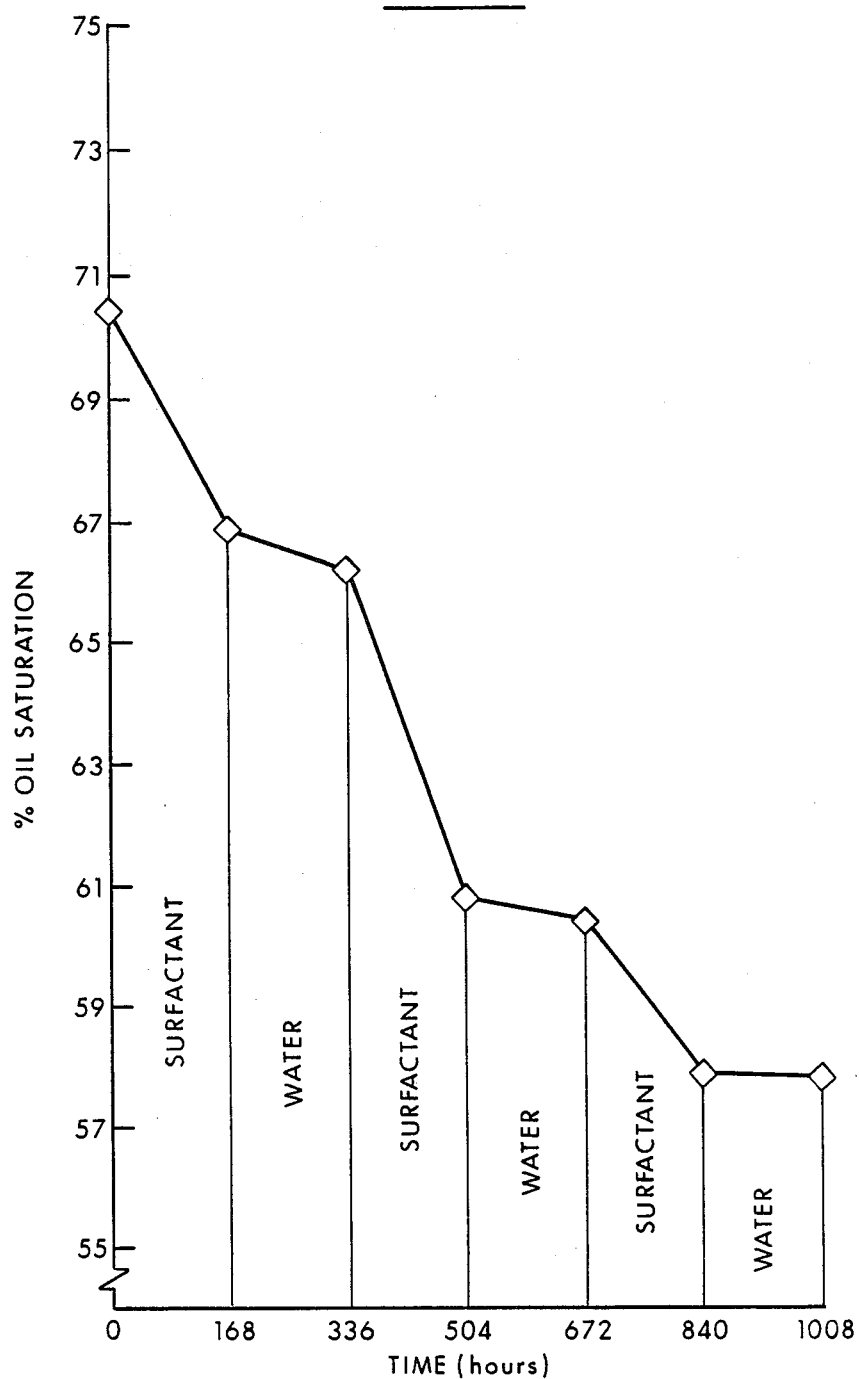
FIG. 1 shows the reduction in oil saturation as a function of time when an oil-wet core is cyclically contacted with the wettability-altering fluids of the present invention.

The present invention is a cyclic process for sequentially injecting wettability-altering fluids into a fractured subterranean formation and recovering oil from the oil-bearing formation. A fractured formation is a formation having a highly permeable connective fracture network channelling through the formation matrix. Connective fracture networks are generally associated with naturally fractured formations rather than artificially fractured ones.

The formation matrix, which makes up the bulk of the formation, is much less permeable than the fracture network. The matrix comprises continuous competent porous formation rock which contains oil within the pore spaces of the rock structure. A pervasive fracture network isolates the matrix into discrete matrix blocks.

The present process is applicable to formations having matrix blocks comprising rock which is characterized on the basis of its wettability as initially oil-wet. The wettability of a rock is defined herein as the ability of the rock surface to preferentially absorb a given liquid and become effectively coated by the liquid in the presence of a second liquid. Thus, oil-wet rock preferentially absorbs oil, water-wet rock preferentially absorbs water, and surfactant-wet rock preferentially absorbs surfactant.

The term "surfactant-wet" has not received wide usage because previous literature has generally termed rock coated with a surfactant in the presence of water and oil as either water-wet or oil-wet. The present invention recognizes that in these cases the surfactant is the true wetting phase rather than the water or oil because the surfactant coats the rock while the oil or water is attracted to and coats the surfactant. Thus, in the present process where the injected surfactant is believed to coat the rock, the term "surfactant-wet" is employed as the most accurate description of wettability.

Formations characterized herein as oil-wet are formations which contain at least some rock, if not all of the formation rock, which is oil-wet. Thus, the matrix blocks of a fractured oil-wet formation, as defined according to the present invention, may contain entirely oil-wet rock or may only partially contain oil-wet rock with the remaining rock having a different wettability. Matrix blocks having some sites which are oil-wet and some sites which are water-wet have been characterized in previous literature as neutral-wet. However, for the purposes of the present invention, the term "oil-wet formation" encompasses both entirely oil-wet formations and neutral-wet formations to the extent that the neutral-wet formations contain some oil-wet sites.

The present process is initiated by injecting a slug containing a wettability-altering agent in solution into an injection wellbore in fluid communication with an oil-wet fractured formation. The wettability-altering agent is a composition from a class of compounds commonly known as surfactants. Surfactants generally have a hydrophilic and a lipophilic character which varies as a function of the surfactant composition as well as the nature of the formation rock and connate fluids which the surfactant contacts.

A surfactant solution is selected for use in the present invention having a character which is capable of altering the wettability of the matrix rock such that the surfactant becomes the preferred wetting phase of the rock over the initial preferred oil-wetting phase. The skilled artisan can readily determine a surfactant which is suitable for altering the wettability of a given rock by laboratory experimentation.

The present invention is not limited to a particular surfactant so long as the surfactant satisfies the above-stated criteria. Nevertheless, a preferred surfactant for use in the present invention is one which achieves a substantially neutral balance between its hydrophilic and lipophilic character within the given formation in which the surfactant is placed. Exemplary types of surfactants which may have utility in the present invention include ethoxylated alkylphenols, ethoxysulfate alkylphenols, ethoxylated alcohols, ethoxysulfate alcohols, alpha olefin sulfonates, internal olefin sulfonates, alkyl aryl sulfonates, petroleum sulfonates, propoxylated ethoxylated alcohols, propoxylated ethoxylated sulfates, and propoxylated ethoxylated sulfonates.

The surfactant solution is prepared by mixing the selected surfactant in a diluent. The diluent is either a hydrocarbon solvent or an aqueous solvent. An aqueous solvent is the preferred diluent, such as fresh water or a brine. Brine generally has a total dissolved solids concentration above about 1000 ppm while fresh water has a total dissolved solids concentration below about 1000 ppm. If a hydrocarbon solvent is used as the diluent, it is preferably a reservoir crude oil. The concentration of the surfactant in the diluent is greater than about 0.01% by weight, preferably between about 0.1% and about 4.0% by weight and most preferably between about 0.2% and about 1.0% by weight.

The actual volume of the initial surfactant solution slug which is injected into the formation depends on which one of several embodiments encompassed within the present invention is being practiced. A number of embodiments of the process are possible, depending on how many injection and production wells are employed and the specific sequence in which they are employed.

According to one embodiment, oil production from a well adjacent one or more offset injection wells is interrupted and a slug of surfactant solution is injected into the production well. The volume of the slug is generally on the order of about 0.1 to about 1.0 formation fracture volumes. Water is then injected into the one or more offset injection wells adjacent the production well while the production well is simultaneously returned to production.

Generally, a substantially larger volume of water than the surfactant solution slug is injected into the formation via the one or more offset injection wells to displace the oil to the surface. The volume of water injected is generally at least two times larger than the volume of the slug of surfactant solution injected and may even be as much as two orders of magnitude or more greater than the volume of surfactant solution.

The above-recited embodiment can further employ an extended surfactant soak time, which is defined as a period of time after injection of the surfactant solution into the formation when the oil production well is shut in. The soak time enables the surfactant solution to imbibe into the matrix blocks of the formation. If a soak time is employed, its duration is determined as a function of the imbibition rate of the surfactant solution into the matrix blocks. Generally a soak time of at least 24 hours is selected, preferably between about 24 hours and about 4224 hours, and most preferably between about 168 hours and about 720 hours.

In other embodiments of the invention, the surfactant solution slug and water are sequentially injected into the formation via one or more offset injection wells adjacent a production well. The surfactant solution is injected first followed by the injection of water into the same one or more wells. The production well can be shut in if desired after injection of the surfactant solution slug to provide a soak time for the solution in the formation. If the production well is shut in, the surfactant solution slug volumes and the soak times employed in this embodiment are similar to those described in the previous embodiment. Oil production is resumed when water injection begins.

If it is impractical to shut in the production well during the injection process due to operating constraints, it is generally necessary to inject a larger volume of surfactant solution into the formation to obtain an equivalent contact time between the surfactant solution and the matrix blocks. Nevertheless, the relative volume of water employed in the process is still substantially greater than the volume of the surfactant solution.

In further embodiments of the invention, the surfactant solution slug is injected into one or more offset injection wells while water is continuously being injected into one or more different offset injection wells. Oil is simultaneously and continuously produced from a production well adjacent the offset injection wells. As in the preceding embodiments, the volume of water injected into the formation relative to the volume of surfactant solution slug is substantially greater.

In all of the above-described embodiments, water injection and oil production are continued until the water-to-oil ratio of the produced fluid exceeds an economic level. At this point, water injection is interrupted and the injection cycle of the present process is repeated anew with the injection of a second slug of the surfactant solution followed by the waterflood. The slugs of subsequent injection cycles after the initial cycle can have the same characteristics as those of the first cycle or the slugs can be modified. For example, one can alter the concentration of the surfactant solution or alter the relative volumes of the slugs, such as by tapering them. Regardless, the injection cycle can be repeated any number of times until the formation is depleted.

The various embodiments recited above are performed in a manner such that the injection of fluids does not substantially increase the formation pressure at the production well. This is either because oil production is performed continuously while the fluids are being injected into the formation at a controlled rate or because the volume of surfactant solution injected into the formation is selected such that the formation pressure at the production well does not substantially increase even if the production well is shut in after surfactant injection.

The water used in the practice of the process may be a brine or a fresh water. The most common source of the water is formation brine which has been produced from the formation and is recycled into the formation as injection water. Generally the injection water has substantially the same mobility as the surfactant solution which precedes it.

The relative depth of the plurality of wells used in the present invention generally depends on the formation contours. However, adjacent injection and production wells are preferably placed at such relative depths that injection fluids can be uniformly displaced horizontally across the entire vertical depth of the oilbearing zone in the formation. Thus, the injected fluids sweep substantially horizontally across the formation and displace oil across the entire vertical depth of the formation into adjacent production wells.

The process is generally performed at ambient formation conditions including temperature, pressure and pH. It is typically unnecessary to modify any of these ambient conditions prior to successful performance of the process.

Although it is not known with certainty, it is believed that the mechanism of the present invention is wettability alteration of the initially oil-wet rock in the matrix blocks of the formation. Wettability alteration enhances the ability of both the surfactant and the water to displace oil from the matrix blocks by imbibition.

In practice, it is believed that the surfactant solution enters the fracture network of the formation after it is injected into a wellbore which is in direct fluid communication with the fracture network. The surfactant solution simultaneously contacts the faces of the matrix blocks bordering the fracture network and, given a sufficient contact time, imbibes across the faces of the matrix blocks. The surfactant solution penetrates at least some distance away from the faces of the matrix blocks into the pores of the rock making up the outer shell of the matrix blocks. The surfactant solution alters the wettability of the oil-wet rock which it contacts to render the rock surfactant-wet. This action simultaneously displaces the oil coating the oil-wet rock back out across the faces of the matrix blocks into the fracture network.

Water is then injected into the formation to displace the oil from the fracture network to a production well. The water also imbibes into the outer shell of the matrix block and desorbs the surfactant from the surface of the surfactant-wet rock therein. The desorption of surfactant restores oil as the wetting phase of the rock in the outer shell of the matrix blocks and enables oil from the interior of the matrix blocks to resaturate and rewet the rock in the outer shell of the matrix blocks. This oil is then susceptible to imbibition displacement by a subsequent slug of surfactant solution when the fluid injection cycle is repeated.

The following examples illustrate the process of the present invention. The examples are not to be construed as limiting the scope of the invention.

EXAMPLE 1

A cylindrical disk is obtained from an oil-wet West Texas carbonate rock. The disk is 1.90 cm thick and 12.7 cm in diameter. The disk is saturated with oil to irreducible water which results in an oil saturation of 70.4%.

300 ml of an ethoxylated alcohol surfactant solution is placed in a beaker. The solution comprises 0.75% by volume ethoxylated alcohol in a synthetic formation water diluent. The synthetic formation water has a total dissolved solids concentration of 11,840 ppm. 300 ml of the synthetic formation water is placed by itself in a second beaker.

The oil-saturated disk is immersed in the surfactant solution of the first beaker for an initial time of 168 hours (one week). The amount of oil produced from the disk into the surrounding solution by spontaneous imbibition during this time is measured. The disk is then removed from the first beaker and immersed in the synthetic formation water of the second beaker. The disk stands in the formation water for the same time period as it stood in the surfactant solution, i.e., 168 hours. The oil produced from the disk during this time due to spontaneous imbibition is measured and the disk is then removed from the second beaker.

This sequence is repeated for two more cycles. After a total elapsed time of 1008 hours (six weeks), the oil produced from the disk appears to have substantially stabilized. FIG. 1 shows that oil saturation has been reduced from an initial oil saturation of 70.4% to about 57.9% over the course of six weeks by the process of the present invention.

An identical disk as above is saturated with oil to irreducible water in the identical manner as above. The disk is placed in a beaker containing 300 ml of the same synthetic formation water as above. After 1.5 years, the disk shows no change in oil saturation. This experiment shows a substantial improvement in oil recovery using the cyclic imbibition process of the present invention rather than a single fluid imbibition process.

EXAMPLE 2

A production well in a West Texas oil field which has an extensive fracture network and which is oil-wet originally produced more than 700 barrels of oil per day. Despite a polymer-augmented waterflood, production from the well has declined to less than 150 barrels of oil per day from its original maximum. Therefore, production of oil from the well is suspended and 5000 barrels of a surfactant solution is injected into the well over a five-day period. The surfactant solution comprises 0.7% by volume ethoxylated alcohol and a formation water diluent having substantially the same total dissolved solids concentration as that of Example 1. After the surfactant solution is injected, the well is shut in for five days. The well is then returned to oil production. 650 incremental barrels of oil are produced over a five-day production interval.

While the foregoing embodiments of the invention have been described and shown, it is understood that alternatives and modifications, such as those suggested and others, may be made thereto and fall within the scope of the invention.

I claim:

1. A process for recovering oil from an oil-wet fractured subterranean oil-bearing formation penetrated by at least two wells from the surface which are in fluid communication with said formation and with one another comprising:
   (a) injecting a first slug of a surfactant solution into said fractured formation via a first of said at least two wells, said surfactant solution capable of becoming the preferred wetting phase of an oil-wet matrix block in said fractured formation;
   (b) contacting a face of said oil-wet matrix block with said surfactant solution for a time sufficient for said surfactant solution to penetrate and become the preferred wetting phase of at least a portion of said matrix block thereby displacing oil from said portion of said matrix block toward said face of said matrix block;
   (c) injecting a second slug of water into said formation via a second of said at least two wells;
   (d) contacting said face of said matrix block with said water for a time sufficient for said water to penetrate and restore said portion of said matrix block to an oil-wet condition;
   (e) displacing said oil away from said face of said matrix block with said water toward said first well;
   (f) recovering said oil from said formation via said first well; and
   (g) repeating steps (a), (b), (c), (d), (e), and (f).

2. The process of claim 1 wherein said first well is shut in for a soak time during step (b).

3. The process of claim 2 wherein said soak time is at least about 24 hours.

4. The process of claim 1 wherein the mobility of said first and second slugs are substantially about equal.

5. The process of claim 1 wherein the volume of said second slug is at least two times the volume of said first slug.

6. The process of claim 1 wherein said water of said second slug is a brine.

7. The process of claim 1 wherein the formation pressure at said first well does not substantially increase during steps (a) and (c).

8. A process for recovering oil from an oil-wet fractured subterranean oil-bearing formation penetrated by at least two wells from the surface which are in fluid communication with said formation and with one another comprising:
   (a) injecting a first slug of a surfactant solution into said fractured formation via a first of said at least two wells, said surfactant solution capable of becoming the preferred wetting phase of an oil-wet matrix block in said fractured formation;
   (b) contacting a face of said oil-wet matrix block with said surfactant solution for a time sufficient for said surfactant solution to penetrate and become the preferred wetting phase of at least a portion of said matrix block thereby displacing oil from said portion of said matrix block toward said face of said matrix block;
   (c) injecting a second slug of water into said first well;
   (d) contacting said face of said matrix block with said water for a time sufficient for said water to penetrate and restore said portion of said matrix block to an oil-wet condition;
   (e) displacing said oil away from said face of said matrix block with said water toward said first well;
   (f) recovering said oil from said formation via a second of said at least two wells; and
   (g) repeating steps (a), (b), (c), (d), (e), and (f).

9. The process of claim 8 wherein said first well is shut in for a soak time during step b).

10. The process of claim 9 wherein said soak time is at least about 24 hours.

11. The process of claim 8 wherein the mobility of said first and second slugs are substantially about equal.

12. The process of claim 1 wherein the formation pressure at said second well does not substantially increase during steps (a) and (c).

13. The process of claim 8 wherein the volume of said second slug is at least two times the volume of said first slug.

14. The process of claim 8 wherein said water of said second slug is a brine.

15. A process for recovering oil from an oil-wet fractured subterranean oil-bearing formation penetrated by at least three wells from the surface which are in fluid communication with said formation and with one another comprising:
   (a) injecting a first slug of a surfactant solution into said fractured formation via a first of said at least three wells, said surfactant solution capable of becoming the preferred wetting phase of an oil-wet matrix block in said fractured formation;
   (b) contacting a face of said oil-wet matrix block with said surfactant solution for a time sufficient for said surfactant solution to penetrate and become the preferred wetting phase of at least a portion of said matrix block thereby displacing oil from said portion of said matrix block toward said face of said matrix block;

(c) injecting a second slug of water into a second of said at least three wells;

(d) contacting said face of said matrix block with said water for a time sufficient for said water to penetrate and restore said portion of said matrix block to an oil-wet condition;

(e) displacing said oil away from said face of said matrix block with said water toward said first well;

(f) recovering said oil from said formation via a third of said at least three wells; and (g) repeating steps (a) and (b).

16. The process of claim 15 wherein steps (c), (d), (e) and (f) are performed continuously.

17. The process of claim 15 wherein the mobility of said first and second slugs is substantially about equal.

18. The process of claim 15 wherein the volume of said second slug is at least two times the volume of said first slug.

19. The process of claim 15 wherein the formation pressure at said third well does not substantially increase during steps (a) and (c).

20. The process of claim 1 wherein said water of said second slug is a brine.

* * * * *